United States Patent [19]
Lo

[11] Patent Number: 5,551,637
[45] Date of Patent: Sep. 3, 1996

[54] MULTI-SPRAY SHOWER HEAD COMPRISING A MIST SPRAY AND LOCKING DEVICE

[76] Inventor: Mei K. Lo, Flat D, Floor 24, 162 Tung Lo Wan Road, Causeway Bay, Hong Kong

[21] Appl. No.: 335,370

[22] Filed: Nov. 3, 1994

[30] Foreign Application Priority Data

Nov. 5, 1993 [GB] United Kingdom ............... 9322825

[51] Int. Cl.$^6$ ........................................ B05B 1/16
[52] U.S. Cl. ........................... 239/394; 239/449
[58] Field of Search ........................... 239/463, 477, 239/478, 390, 397, 446, 449, 447, 436

[56] References Cited

U.S. PATENT DOCUMENTS

| 2,567,642 | 9/1951 | Henshaw | 239/449 |
| 4,081,135 | 3/1978 | Tomano | 239/449 X |
| 4,084,271 | 4/1978 | Ginsberg . | |
| 4,614,303 | 9/1986 | Moseley, Jr. et al. . | |
| 4,657,185 | 4/1987 | Rundzaitis . | |
| 4,703,893 | 11/1987 | Gruber | 239/440 X |
| 4,754,928 | 7/1988 | Rogers et al. . | |
| 5,172,866 | 12/1992 | Ward | 239/449 X |
| 5,232,162 | 8/1993 | Chih | 239/394 |

FOREIGN PATENT DOCUMENTS

| 873808 | 4/1942 | France | 239/394 |
| 1039750 | 10/1953 | France | 239/449 |
| 3440901 | 9/1985 | Germany | 239/463 |
| 2066704 | 7/1981 | United Kingdom . | |

Primary Examiner—Kevin Weldon
Attorney, Agent, or Firm—Young & Thompson

[57] ABSTRACT

A multi-spray shower head comprising a mist spray. When used with hot water this fine spray becomes steam. To prevent the user from scalding him- or herself immediately after using the mist spray with such hot water, the shower head includes a water operated safety pin assembly (60) which locks the shower head on the mist spray mode until the water pressure is reduced below a predetermined level. The mist spray is formed by passing water through mist channels (112) which have mist pins (114) which form spiralling water paths whereby water emerges from small diameter mist apertures (28) as a fine spray.

12 Claims, 15 Drawing Sheets

MULTI-SPRAY SHOWER HEAD COMPRISING A MIST SPRAY AND LOCKING DEVICE

FIELD OF THE INVENTION

The present invention relates to shower heads and particularly to shower heads which have more than one type of shower spray.

BACKGROUND OF THE INVENTION

Some shower heads have a single spray plate in which there are a series of apertures. When the water supply in turned on, water is delivered to the spray plate is a steady, continuous stream. This is a single mode shower head and the type of spray is referred to herein as a regular spray.

Shower heads with more than one mode are known. Such modes include a regular spray and pulsed spray. The user selects the mode required by moving one part of the shower head relative to the rest of the shower head. One example of such a shower head is disclosed in U.S. Pat. No. 4,754,928. The shower head disclosed in this specification has four spray modes which includes a variable pulsating misting spray. The user selects the type of spray by rotating the bottom section of the shower head.

The misting effect in U.S. Pat. No. 4,754,928 is achieved by using a water path which expands in diameter during its passage through the shower head. The increase in diameter causes the liquid to atomise and so produces a mist. Similarly, U.S. Pat. No. 4,657,185 discloses a mist spray caused by a pressure drop due to a divergent frustoconical shape in the walls of the spray nozzle.

One effect of a mist spray is the creation of steam and so, in effect, produce a sauna in the shower stall. The effect is enhanced by using very hot water. The user then runs the risk of scalding himself/herself by selecting a different shower mode immediately after using the mist spray with very hot water.

U.S. Pat. No. 4,084,271 describes a shower attachment which enables a user to produce a sauna within a shower cubicle. The device in that patent produces steam by directing the hot water through a dedicated hose attached to the water supply behind the shower head and spraying it through a nozzle against the wall of the shower cubicle. The water supply is diverted from the normal shower head to the steam nozzle and back again by the user operating a dual ended plunger. Although, the specification refers to the possibility of scalding, it is merely in relation to the effect of the steam.

GB 2,066,704 discloses a device which produces steam through an aperture in the side of the shower head by directing hot water at a deflector shaped so that it atomises the liquid and sprays the droplets into the shower cubicle. A user switches between mist mode and other shower modes by sliding part of the shower head with respect to the water input. The design of the mist producing element is such that in order for the user to return to one of the other shower modes he must overcome the pressure of water acting on the deflector. Although, the patent discloses that the force of water makes such adjustment "extremely difficult", such adjustment is not completely impossible. Further, in the device disclosed in this patent, the mist producing part is fixed to the wall, even if used in connection with a shower head which is detachable.

SUMMARY OF THE INVENTION

Accordingly, it is the intention of the present invention to provide a shower head having more than one spray mode in which the mist spray is delivered through the same face of the shower head as the other spray modes and which incorporates a locking device which prevents the user from selecting a different shower mode after using the mist spray and so risk scalding him or herself with very hot water.

According to the present invention, there is provided a shower head having more than one spray mode including a mist spray mode, the shower head comprising a portion including a water inlet, means moveable relative to the inlet portion to bring selectively into register with the inlet a plurality of spray faces each capable of providing a different spray mode, and one of which is a spray face producing the mist spray, and a locking device operable to prevent movement of the mist-producing spray face relative to the inlet portion when the mist spray mode has been selected.

Suitably, the locking device is moveable into a locking position to prevent such movement by means of pressure of water within the shower head and is preferably releasable to allow the said movement when the pressure of water within the shower head is below a threshold value. It is preferred that the locking device is only operable in connection with the mist spray mode.

In a preferred embodiment, the locking device comprises a locking pin moveable between an open position in which the locking pin allows the said movement of the mist-producing spray face and a locking position in which the locking pin prevents the said movement of the mist-producing spray face. Suitably, the locking pin is biassed towards the open position. Preferably, the locking pin is located within the inlet portion and the means moveable relative to the inlet portion includes a restraint with which the locking pin is engageable in the mist spray mode to prevent such movement.

The mist spray mode suitably comprises mist channels leading to mist apertures and a spiralling water path in each channel whereby water will emerge from the mist apertures as a fine spray or mist. In a preferred form, each mist channel contains a mist pin which at least partly provides the spiralling water path. The water path may be provided by spiralling grooves in the surface of each mist pin or alternatively by a twisted water channel through each mist pin. In an alternative form, the water path may be provided between spiralling grooves in the walls of each mist channel and the mist pin is in the form of a stopper located in each mist channel adjacent the grooves.

BRIEF DESCRIPTION OF THE DRAWINGS

Embodiments of the invention will now be described, by way of illustration only, and with reference to the drawings, wherein.

DESCRIPTION OF THE PREFERRED EMBODIMENTS

Figure 1:
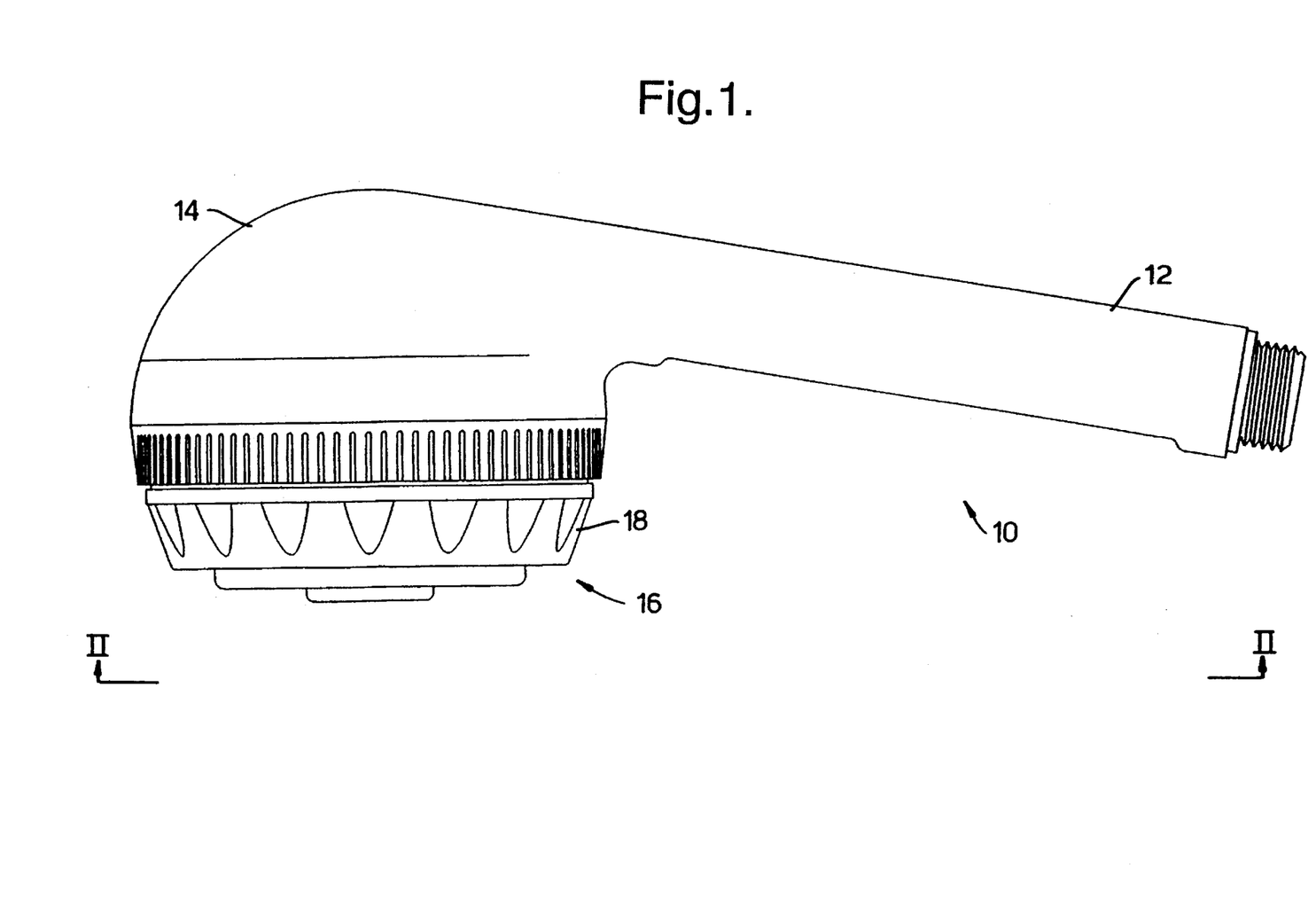
FIG. 1 shows a side view of a shower head according to one embodiment of the present invention.

As shown in FIG. 1, the shower head 10 comprises a handle 12, an outer body 14 and a multi-spray head 16. The multi-spray head is surrounded by a grip ring 18.

Figure 2:
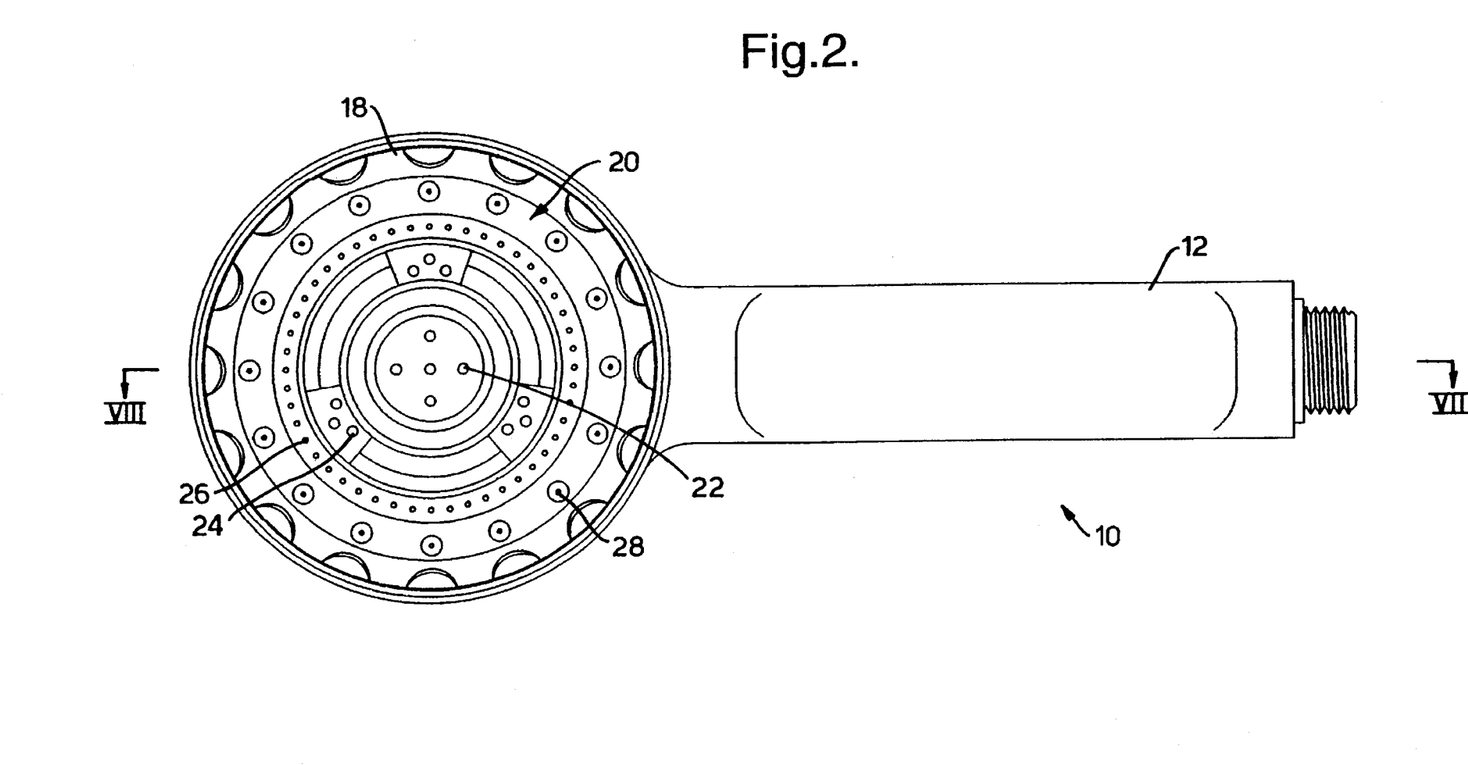
FIG. 2 shows a view along II—II in FIG. 1.

FIG. 2 shows the shower face 20 of the multi-spray head. There are four sets of apertures in the shower face 20 which are arranged concentrically. Only one set of apertures at a time can be connected to the water supply and each provides a different type of water spray. The apertures 22 in the central area provide a limited water flow, known as regulated water saver. The first ring of apertures 24 are arranged in 3 groups.

Water is delivered to each of these groups of apertures in turn to produce a pulsed spray. The apertures 26 in the second ring are spaced equally and produce a regular spray. From the apertures 28 in the outer ring water emerges as a fine spray or in the form of a mist.

Figure 3:
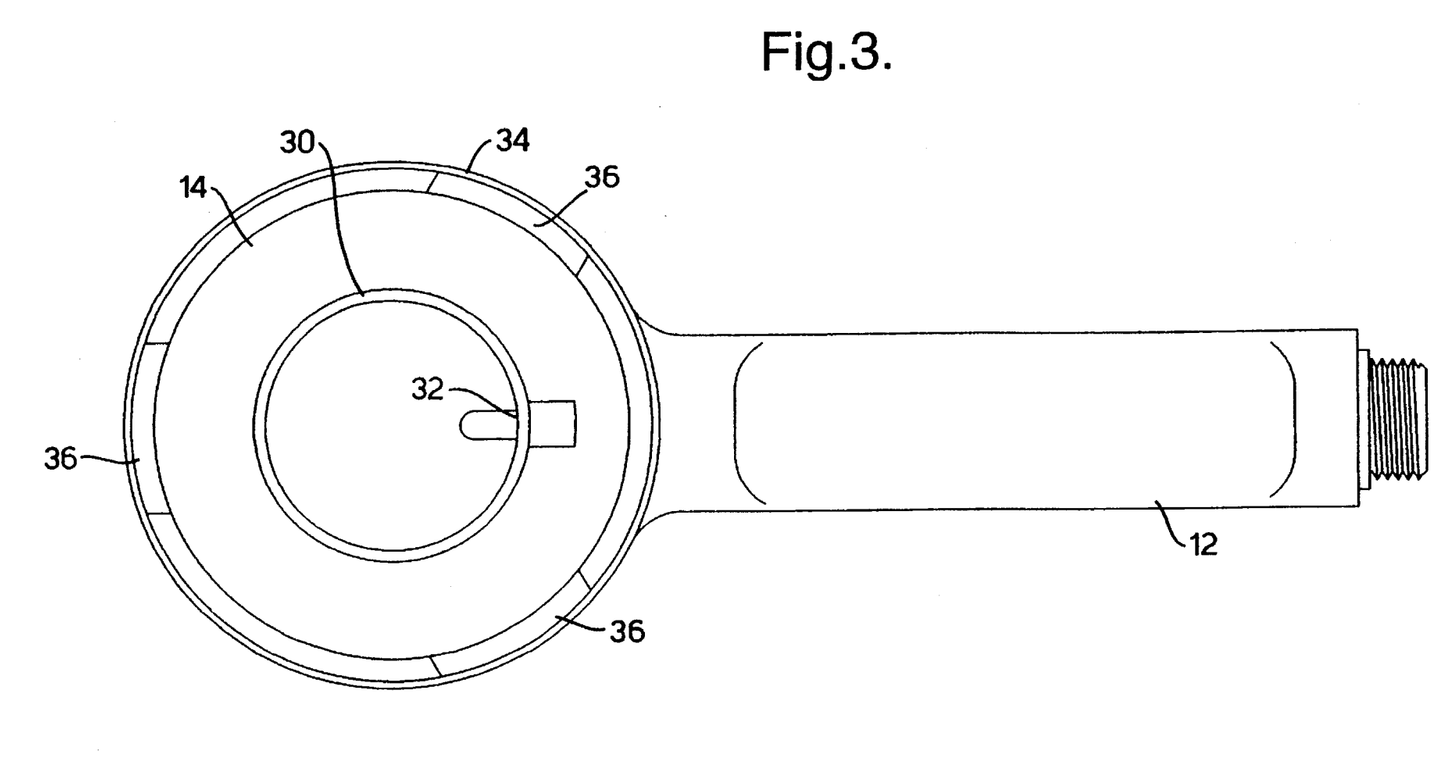
FIG. 3 shows a view of the inside of the outer body.
Figure 4:
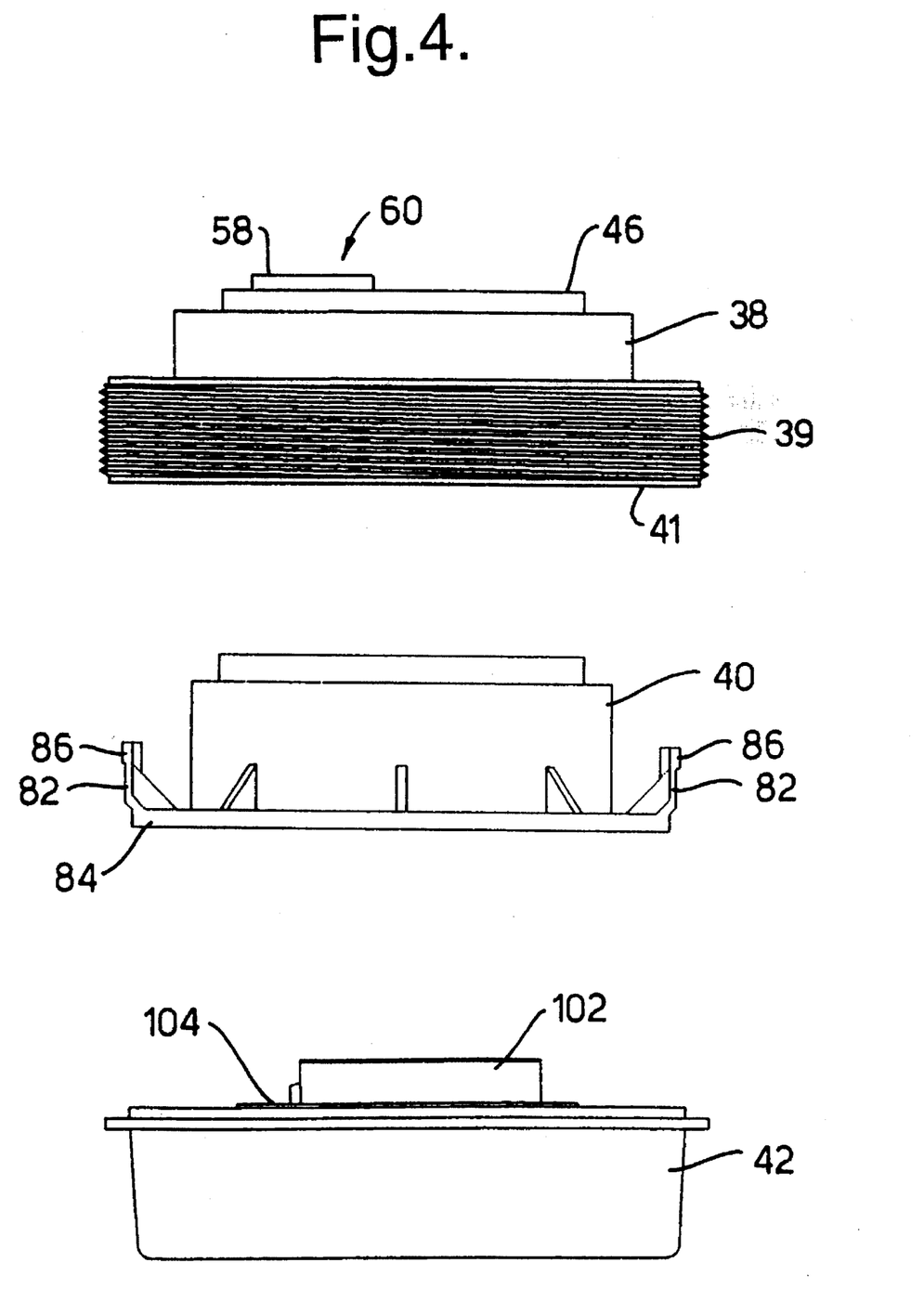
FIG. 4 shows an exploded side view of part of the shower head.
Figure 5A:
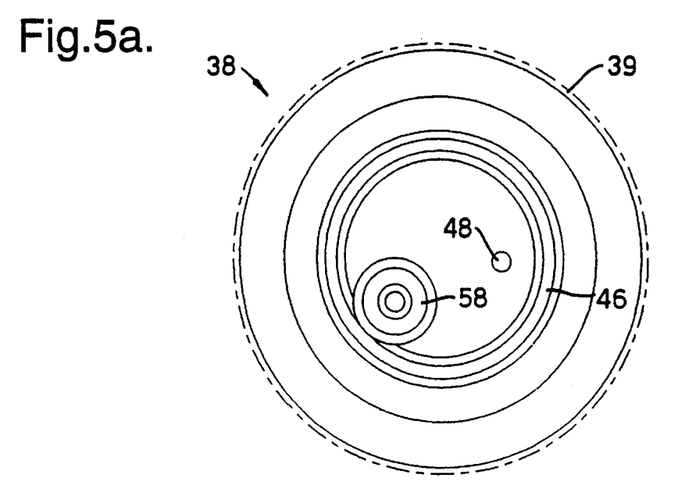
FIG. 5a shows the inner body from above.
Figure 5B:
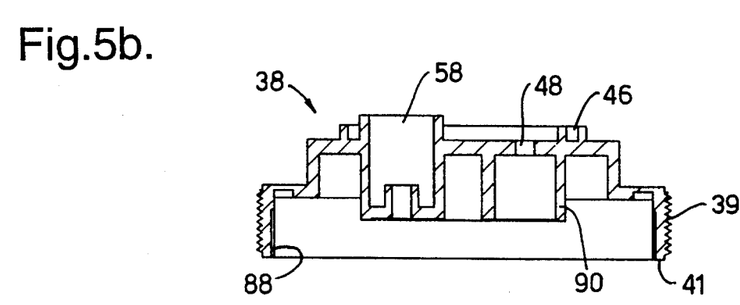
FIG. 5b shows a cross-section of the inner body.
Figure 5C:
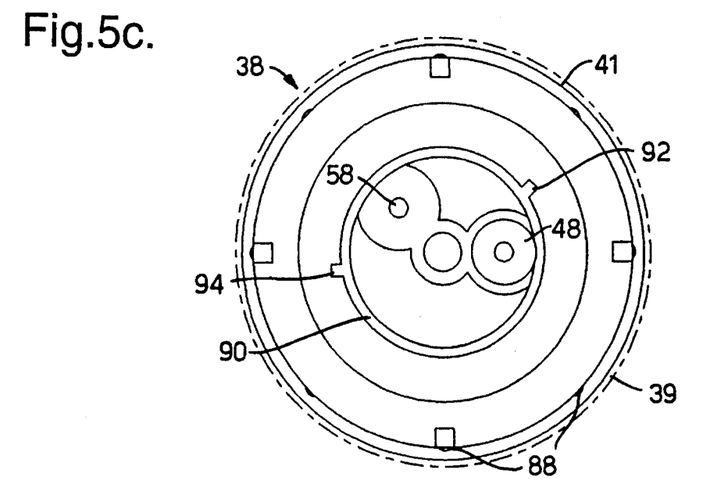
FIG. 5c shows the inner body from below.
Figure 6A:
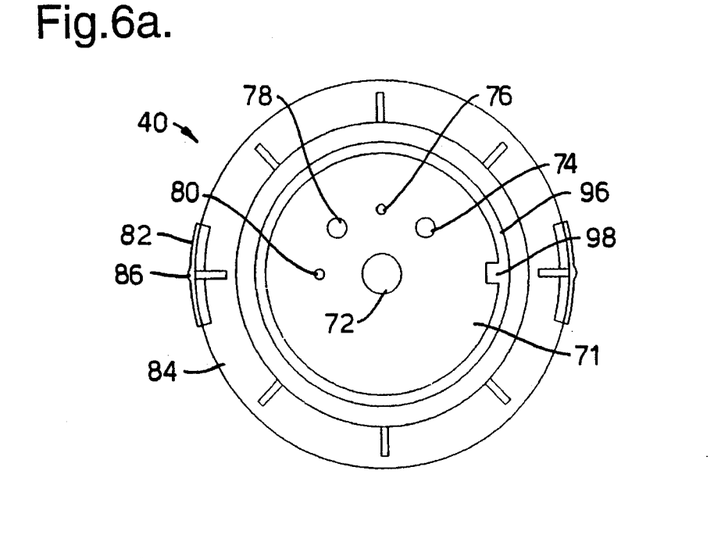
FIG. 6a shows the divider from above.
Figure 6B:
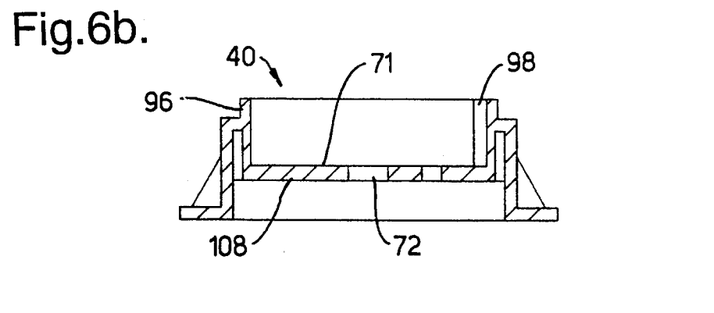
FIG. 6b shows a cross-section of the divider.
Figure 6C:
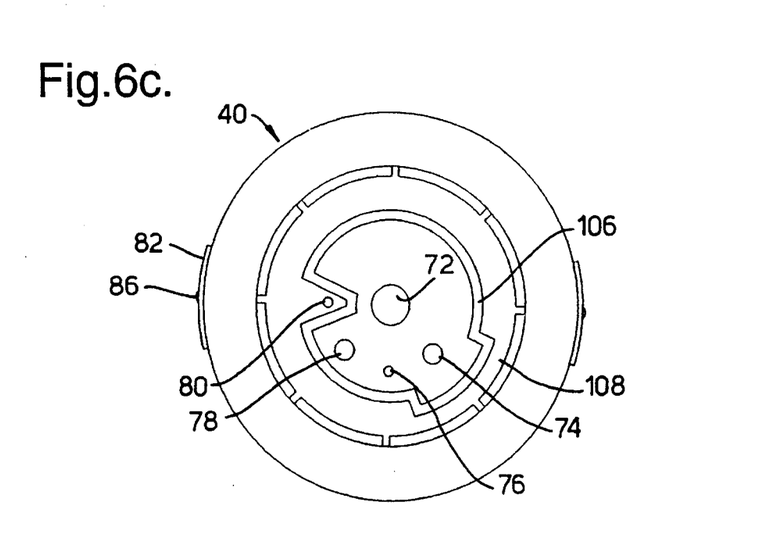
FIG. 6c shows the divider from below.
Figure 7A:
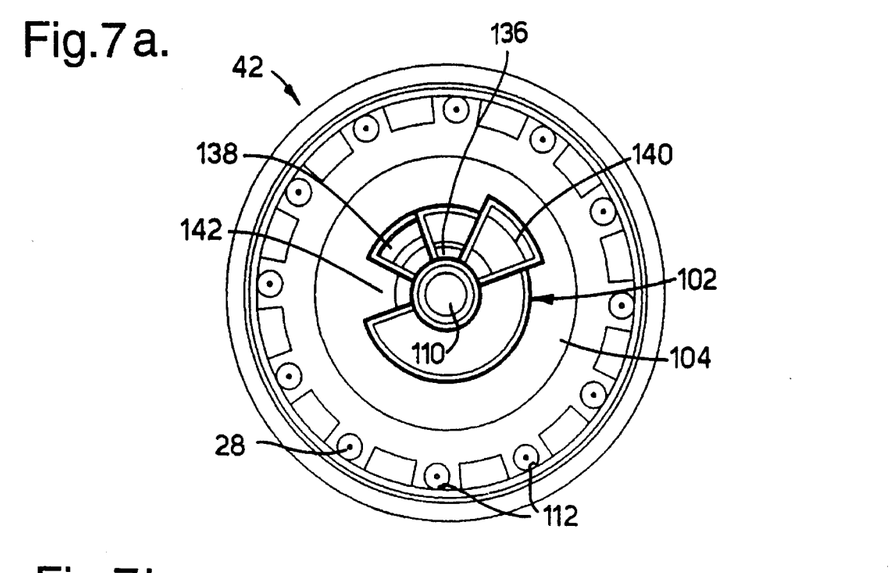
FIG. 7a shows the diverter from above.
Figure 7B:
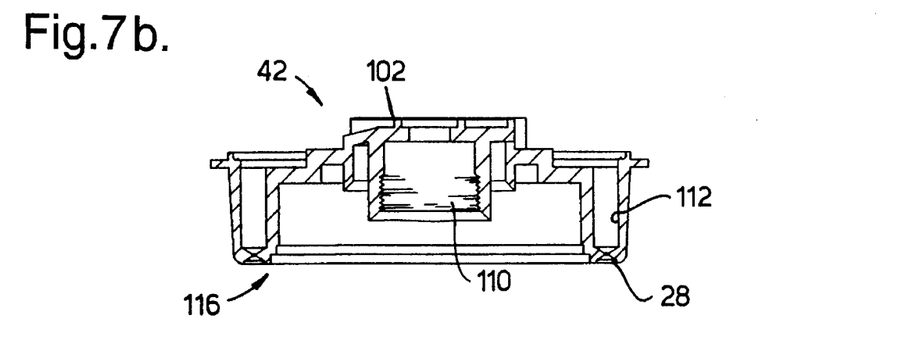
FIG. 7b shows a cross-section of the diverter.
Figure 7C:
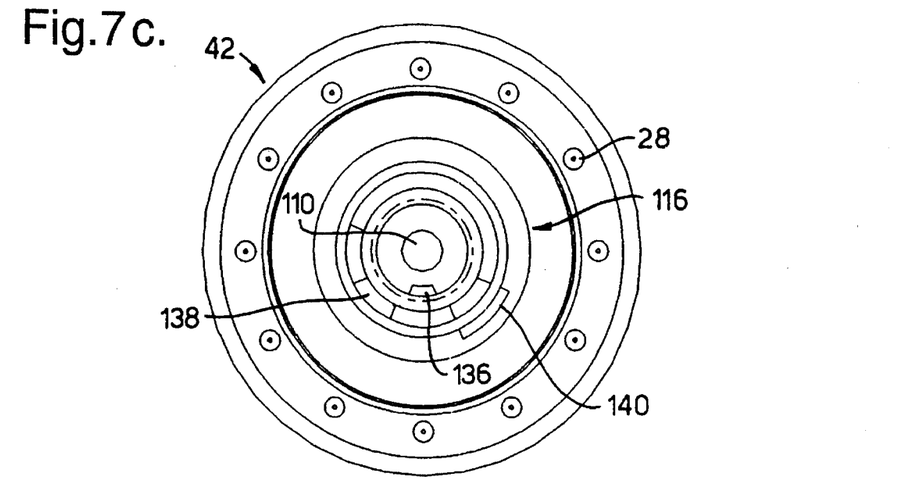
FIG. 7c shows the diverter from below.
Figure 8:
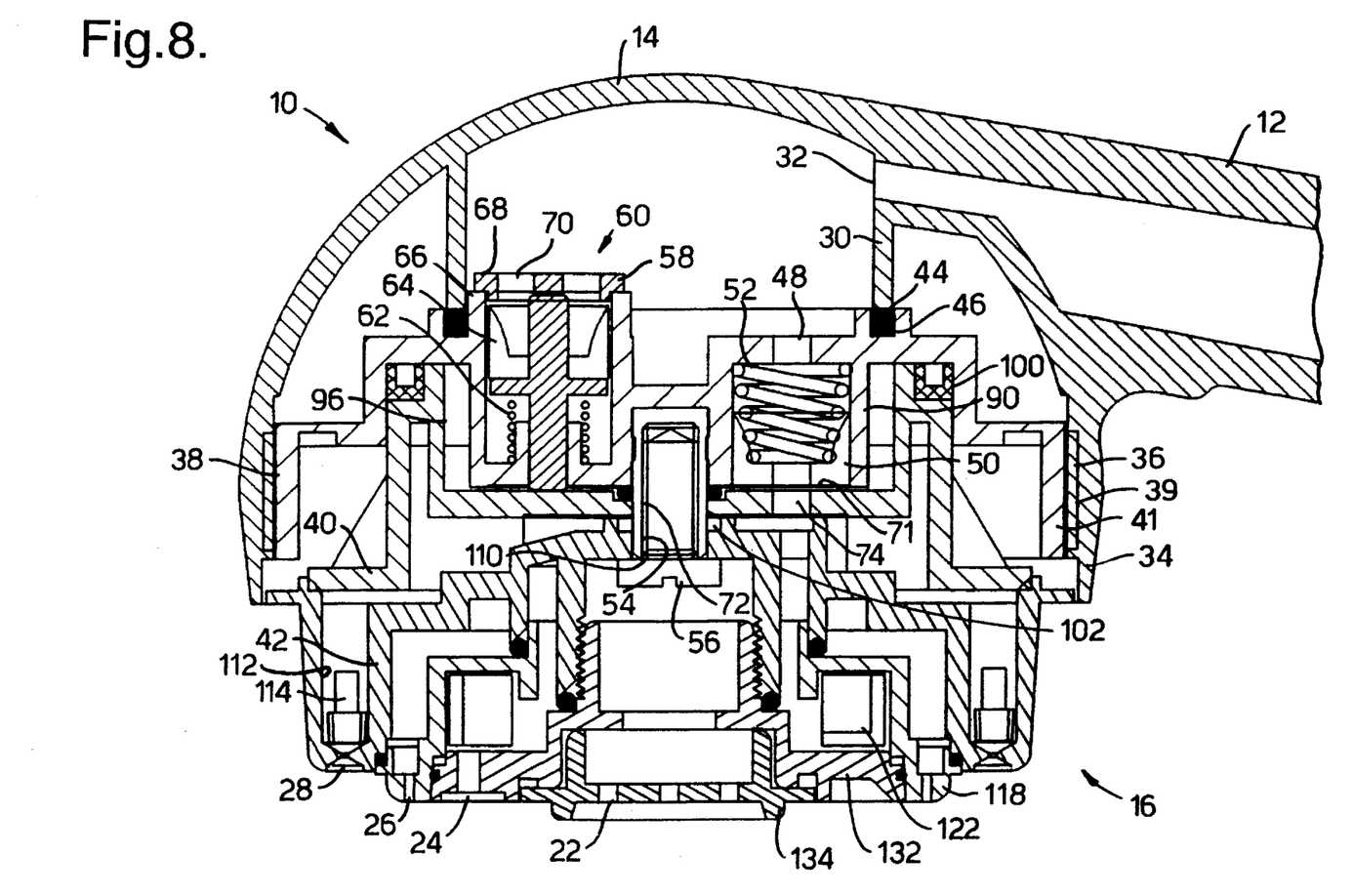
FIG. 8 shows a cross-section of the shower head along VIII—VIII in FIG. 2.

FIG. 3 shows the interior of the outer body. The interior of the outer body has a skirt 30 dividing the interior into two parts. The handle 12 is hollow. The interior of the handle 12 is connected to the interior of the outer body 14 by an aperture 32 at the base of the skirt 30. Part of the inner surface of the outer body has grooved mouldings 36. These are arranged so that the multi-spray head 16 can be screw threadedly attached to the outer body 14.

The multi-spray head will now be described with reference to FIGS. 4 to 8. The multi-spray head 16 comprises an inner body 38, a divider 40 and a diverter 42. The inner body 38 has a screw-thread 39 on the outer surface of its outer rim 41 and is designed to engage with the grooved mouldings 36 on the inside of the outer body 14. A flat washer 44 is located in a circular groove 46 on the top of the inner body 38. The skirt 30 in the outer body 14 engages the groove 46 and the join is sealed by the washer 44.

There is a channel 48 through the inner body 38 for water to pass from the interior of the outer body 14 to the divider 40. Water flow is restricted to the channel by a seal comprising a gasket 50 and a spring 52 (shown in FIG. 8). The spring 52 holds the gasket 50 against surface of the divider 40. The inner body 38 also has a nut 54 centrally located so that the divider 40 and the diverter 42 can be attached to the inner body 38 by a screw 56.

The inner body 38 also has a bore 58 in which a safety pin assembly 60 (shown in FIG. 8) is located. The safety pin assembly 60 comprises a spring 62, a gasket 64, a safety pin 66 and a pin cover 68. The pin cover 68 holds the 10 safety pin 66 in the bore 58 with the spring 62 partly compressed. The pin cover 68 has apertures 70, through which water can pass into the bore 58. The function of the safety pin assembly 60 is discussed below. The gasket 64 seals the bore 58 and prevents water leakage.

The divider 40 and the diverter 42 form a single unit in the shower head assembly. Four separate channels run through the divider-diverter unit, each leading to one of the four sets of apertures 22, 24, 26, 28 in the shower face 20. The divider-diverter unit is rotatable with respect to the inner body so that each of these channels may in turn be connected to the channel 48 in the inner body 38. The gasket 50 serves to restrain water from leaking into any channel in the divider-diverter unit other than the one with which the channel 48 is aligned.

The divider 40 comprises a central disk 71. It has a central aperture 72 into which the nut 54 fits when the divider 40 is aligned with the inner body 38. There are four other apertures 74, 76, 78 and 80 in the central disk 71, each of which leads into one of the four channels running through the divider-diverter unit. The divider has an outer rim 84 with two flanges 82. Each flange 82 has a small protrusion 86 which engages in shallow depressions 88 on the internal surface of the outer rim 41 of the inner body 38. These depressions 88 are spaced such that the two protrusions 86 engage in a pair of depressions 88 when one of apertures 74, 76, 78, 80 is aligned with the channel 48. The inner body 38 has an inner skirt 90 which has two stops 92. The divider 40 has a ring 96 above the central disk 71 which has a stop 98. The rotation of the divider 40 relative to the inner body 38 is thus restricted by the stop 98 abutting against stops 92 and 94 respectively. The grip ring 18 aids the user in rotating the divider-diverter unit when changing spray mode.

A V-Seal 100 between the divider 40 and the inner body 38 restrains water leakage.

The diverter 42 has a central aperture 110 for the screw 56. The diverter 42 has a moulding 102 on its upper surface 104 which engages the rim 106 on the lower surface 108 of the divider 40. The moulding 102 forms part of the four channels which direct water from the channel 48 to the different spray outlets. Water is directed from aperture 76 in the divider 40 to the water saver apertures 22 through a channel 136 in the moulding 102. Water is directed from aperture 78 in the divider 40 to the pulse mode apertures 24 through a channel 138 in the moulding 102. Water is directed from aperture through a channel 140 in the moulding 102, to the regular spray apertures 26. Water from aperture 80 is directed along a channel 142 in the moulding to the mist apertures 28. The divider 40 and diverter 42 are placed together by aligning the rim 106 on the lower surface 108 of the divider 40 with the moulding 102 on the upper surface 104 of the diverter 42. Each aperture in the divider 40 is then aligned with the correct channel in the moulding 102.

Figure 9:
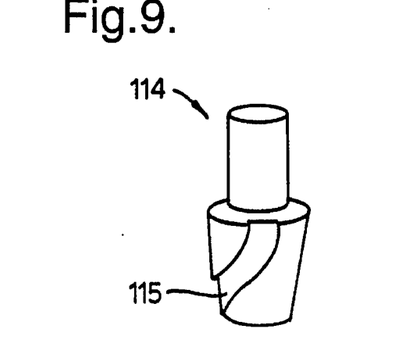
FIG. 9 shows a mist pin.
Figure 10:
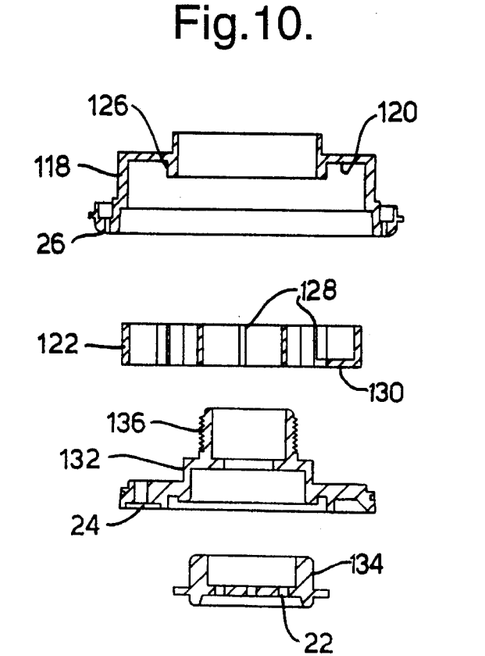
FIG. 10 shows an exploded cross-section of the spray plates.
Figure 11A:
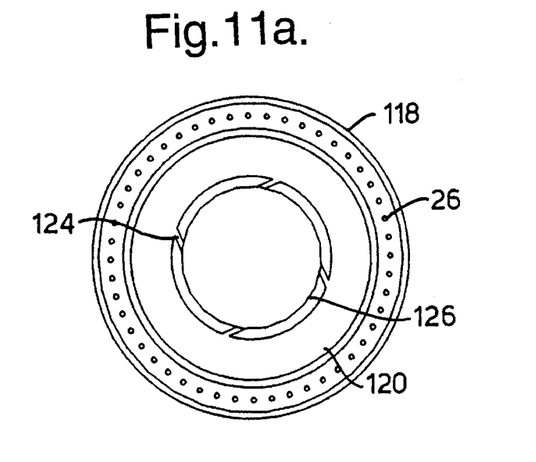
FIG. 11a shows the spray plate from below.
Figure 11B:
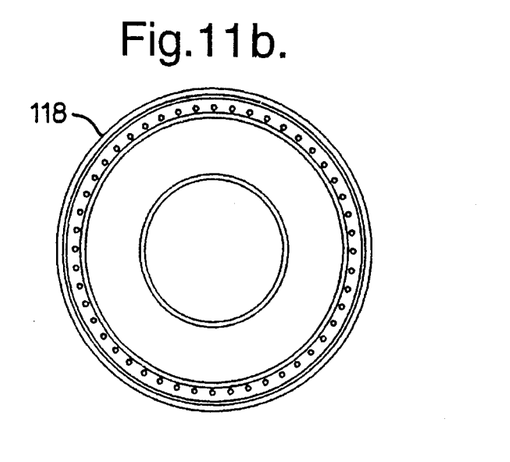
FIG. 11b shows the spray plate from above.
Figure 12A:
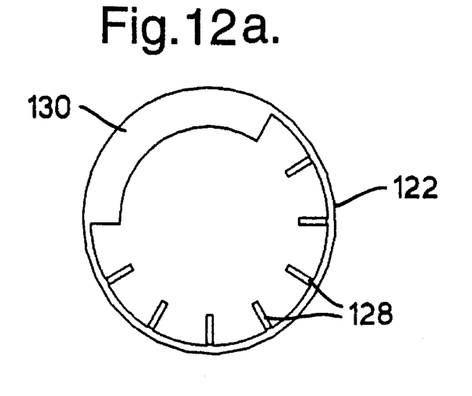
FIG. 12a shows the impeller from below.
Figure 12B:
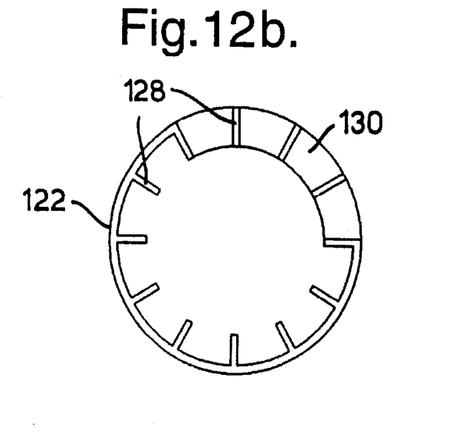
FIG. 12b shows the impeller from above.
Figure 13A:
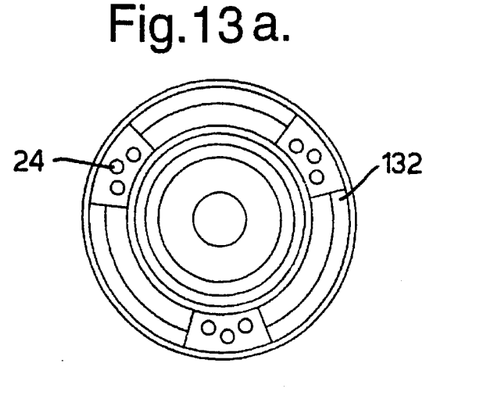
FIG. 13a shows the pulse plate from below.
Figure 13B:
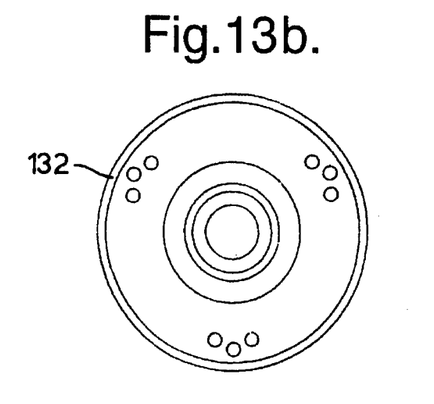
FIG. 13b shows the pulse plate from above.
Figure 14:
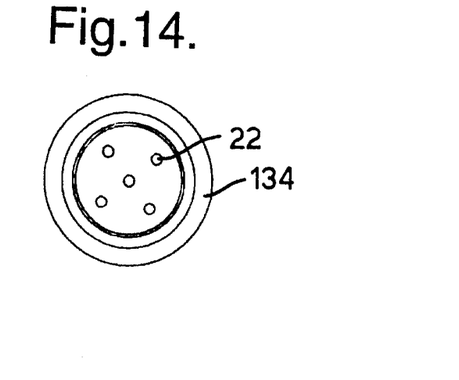
FIG. 14 shows the mini spray plate from below.

Around the rim of the diverter 42 are channels 112 leading to the mist apertures 28. Each channel 112 contains a mist pin 114, shown in FIGS. 8 and 9. Each mist pin 114 has a pair of spiralling grooves 115 which twist the stream of water travelling through channels 112 and so cause it to be emitted from the mist apertures 26 as a fine mist.

Once the mist pins 114 have been placed in the channels 112, the divider 40 and the diverter 42 are fitted together. They may then be welded or heat sealed to form a single unit.

The underside 116 of the diverter 42 comprises a series of concentric mouldings to which spray plates, shown in FIGS. 10 to 14, are attached. Spray plate 118 comprises the regular spray apertures 26. It snap fits with the mouldings on the underside 116 of the diverter 42. It has a seating 120 for an impeller 122 which is the functional part of the pulse spray mode. The spray plate 118 has an inner skirt 126 with four slots 124 cut at an angle to the circumference. The impeller 122 comprises a series of equispaced radial projections 128 and a flange 130 covering one-third of its surface. Water directed to the pulse spray mode goes through the slot 124 and, because of the angle, impacts on the radial projections 128 of the impeller and causes it to rotate.

Pulse plate 132 comprises the groups of pulse apertures 24. It is attached to the diverter 42 by a screw thread 136. The flange 130 of the impeller 122 covers approximately one-third of the pulse apertures 24 at any one time as the impeller 122 rotates. This blocks the water supply to one-third of the apertures in succession and so results in a pulsed water supply. The mini-spray plate 134, comprising the regulated water saver apertures 22, snap fits into the centre of the pulse plate 132.

Figure 15:
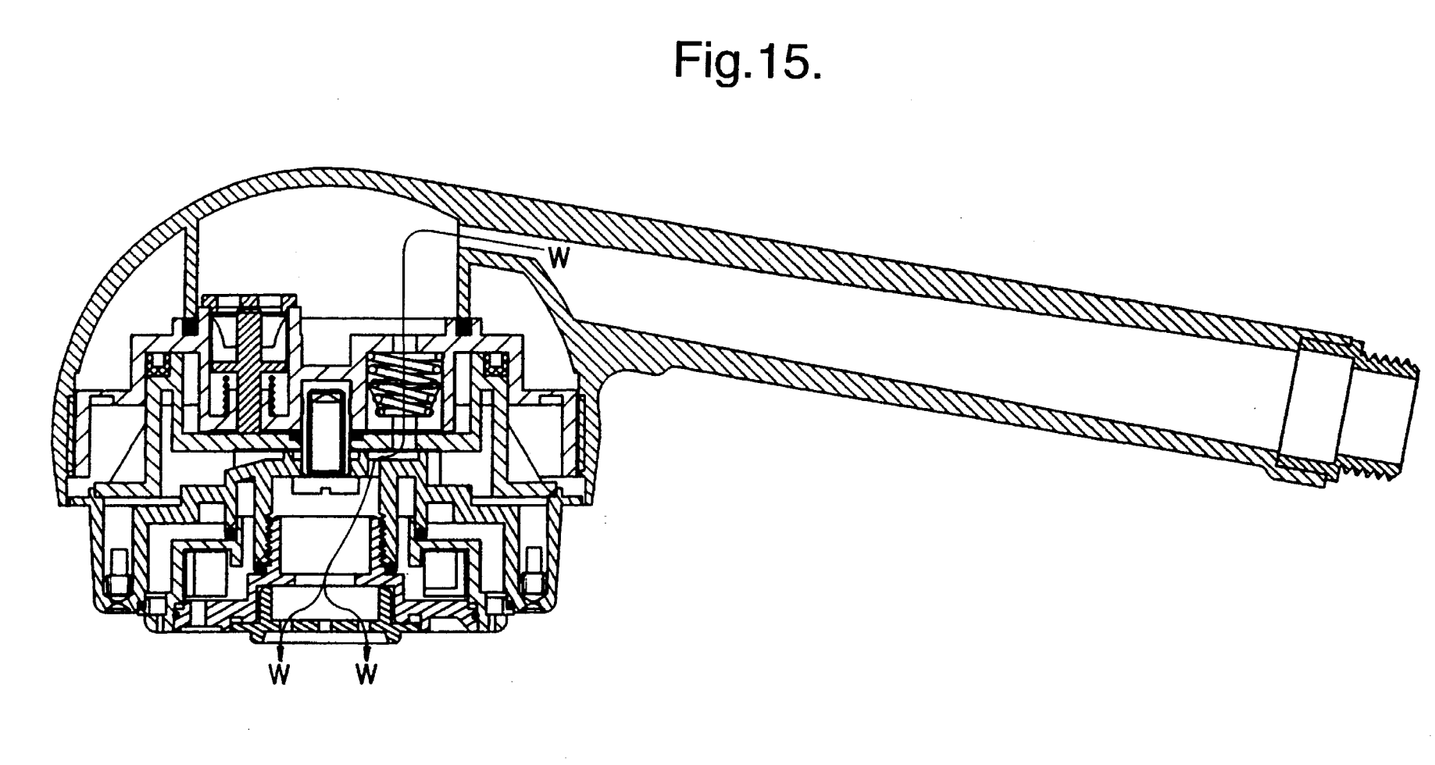
FIGS. 15 to 18 show cross-sectional views with the water path for each spray mode illustrated.

FIG. 15 shows the shower head with the divider-diverter unit rotated to the regulated water saver spray. The line w—w illustrates the water path.

Figure 16:
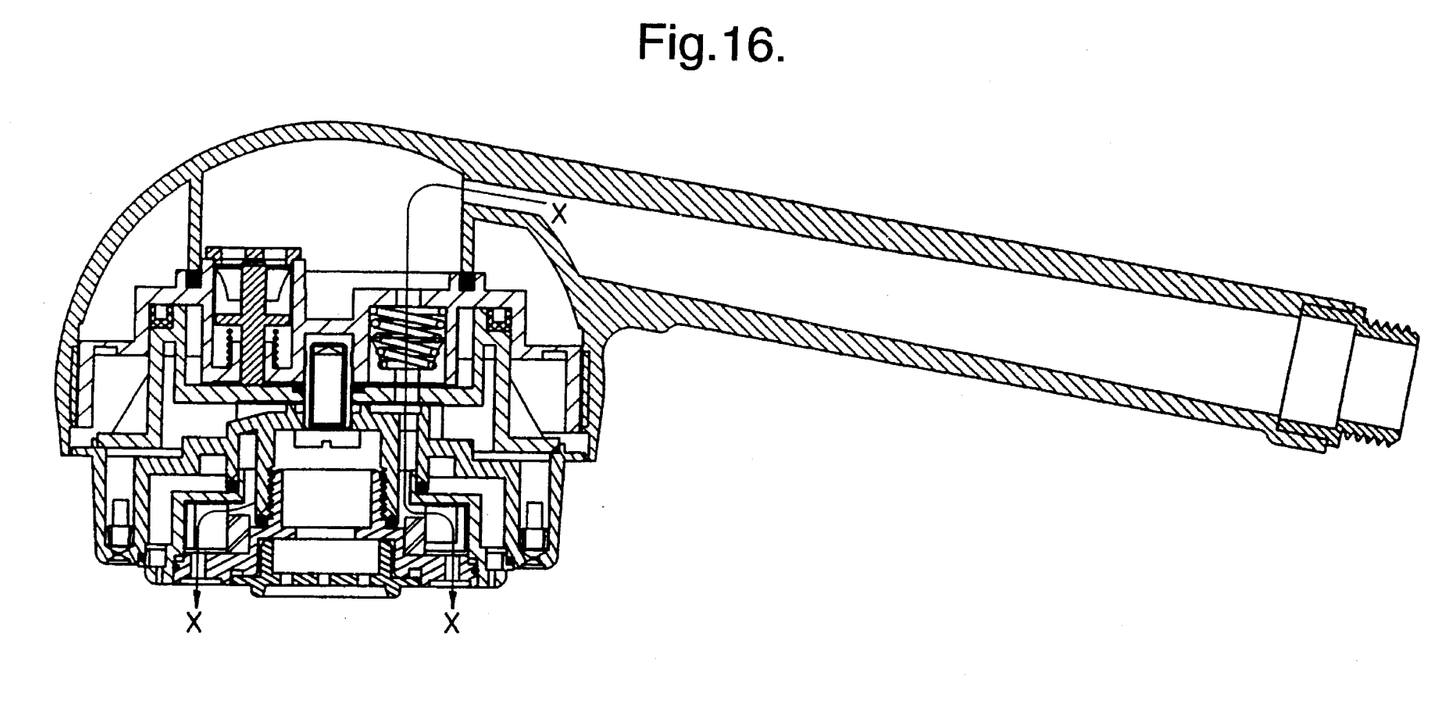

FIG. 16 shows the shower head with the divider-diverter unit rotated to the pulse spray mode. The line x—x illustrates the water path.

Figure 17:
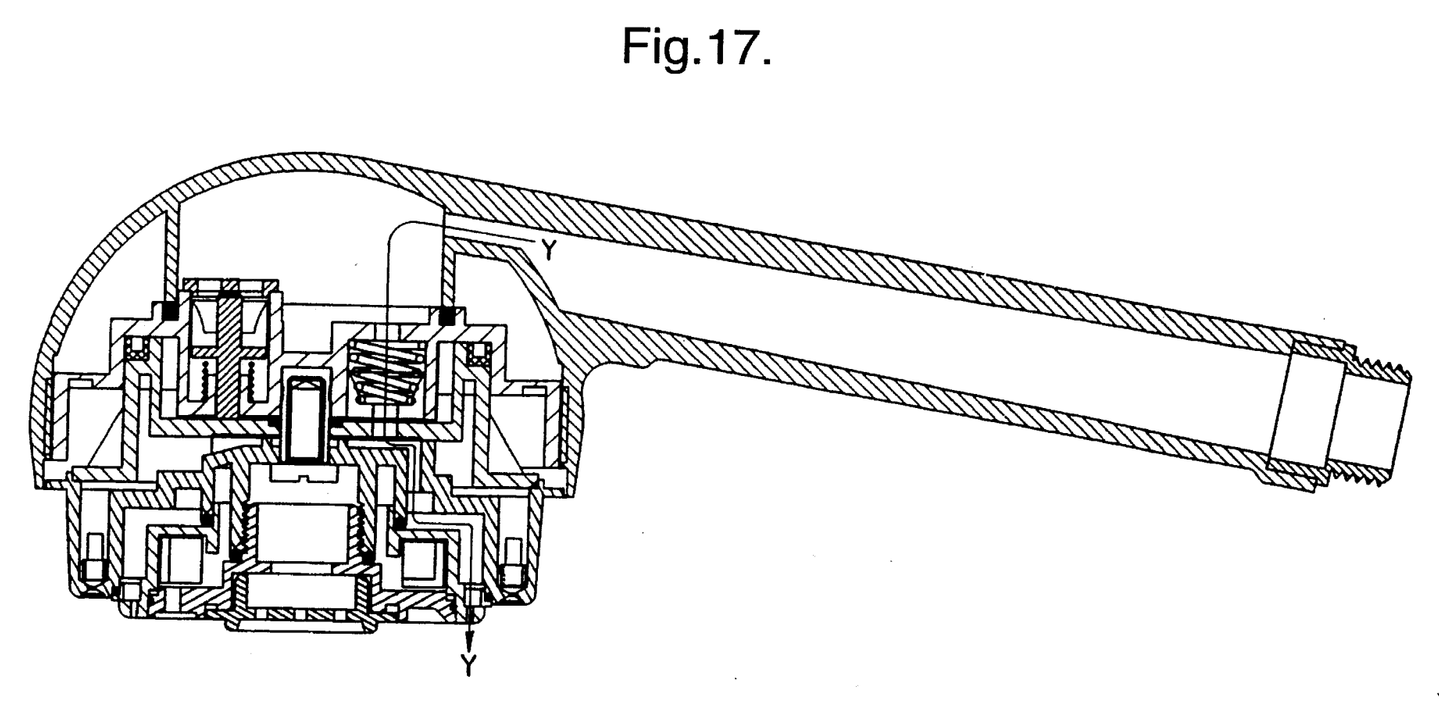

FIG. 17 shows the shower head with the divider-diverter unit rotated to the regular spray mode. The line y—y illustrates the water path.

Figure 18:
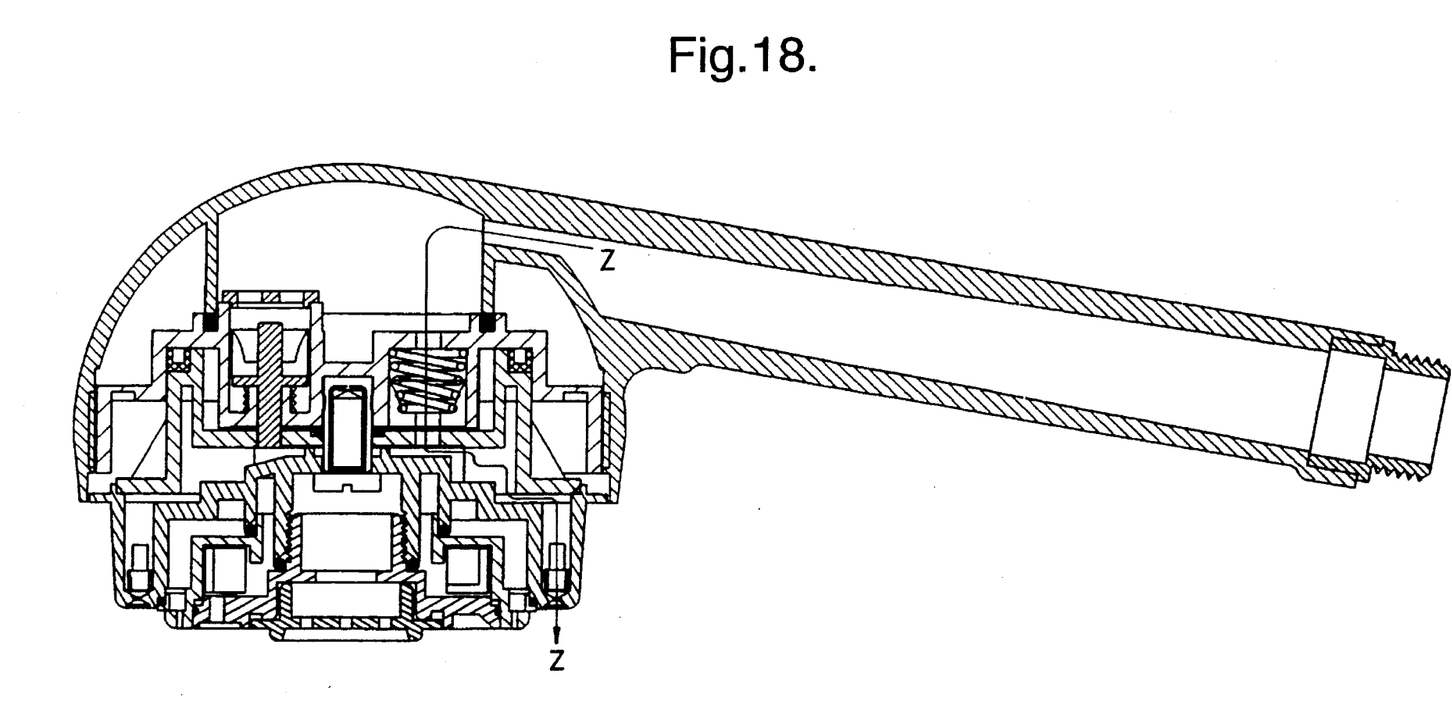

FIG. 18 shows the shower head with the divider-diverter unit rotated to the mist spray mode. The line z—z illustrates the water path.

The mist spray is most effective when used with hotter water than is usual for showering. The effect of the grooves 115 in the mist pins 114 together with the small diameter mist apertures 28 when such hot water passes down the mist channels is to create steam, which can be used for saunas, facial cleansing etc. Because of this use of hotter water there is a risk that a user, returning the shower head from the mist spray mode to one of the other spray modes, could scald him/herself. The safety pin assembly 60 prevents such an occurrence. The spring 62 in the safety pin assembly 60 usually biasses the safety pin, 66 away from the divider 40. However, when the water pressure exceeds 10 psi, its force is greater than that exerted by the spring 62. The pressure of water on the surface of the gasket 64 will cause it to push the safety pin 66 towards the divider 40, so compressing the spring 62 further. Usually the safety pin 66 will rest against the central disk 71 of the divider 40. However, when the shower head is rotated to the mist spray mode the safety pin 66 is bought into alignment with the aperture 74 in the central disk 71. The water pressure acting on the surface of the gasket 64 will cause the safety pin 66 to move into this aperture and so lock the shower head in the mist spray mode. In order to release the safety pin 66, the user must reduce the water pressure to below 10 psi so that the spring 62 will expand and push safety pin 66 back into the bore 58. The shower head can then be rotated to a different spray mode.

A mist or fine spray can be produced by a number of specific embodiments, some of which are known from the prior art. The essential features of the mist spray disclosed in this specification are a twisted water path and a small mist aperture. Two further ways of implementing this aspect of the present invention are now described.

Figure 19:
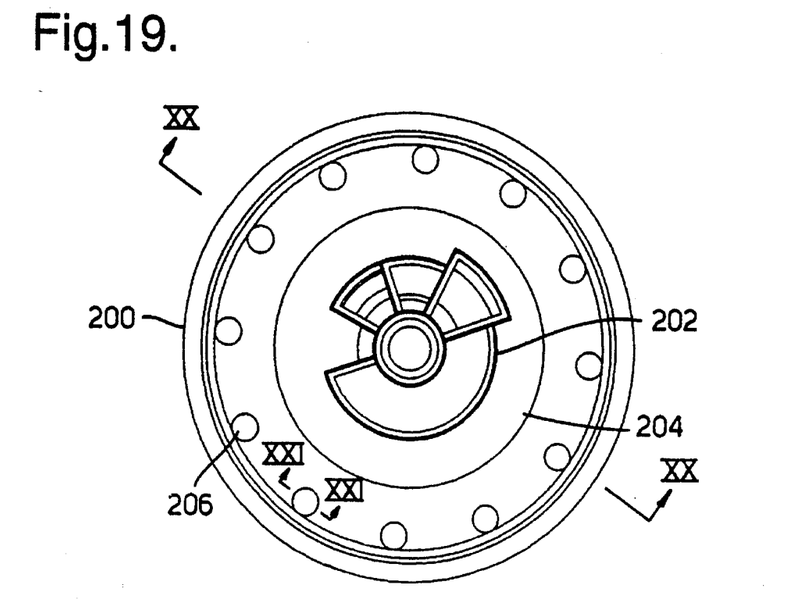
FIG. 19 shows a divider according to a second embodiment of present invention from above.
Figure 20:
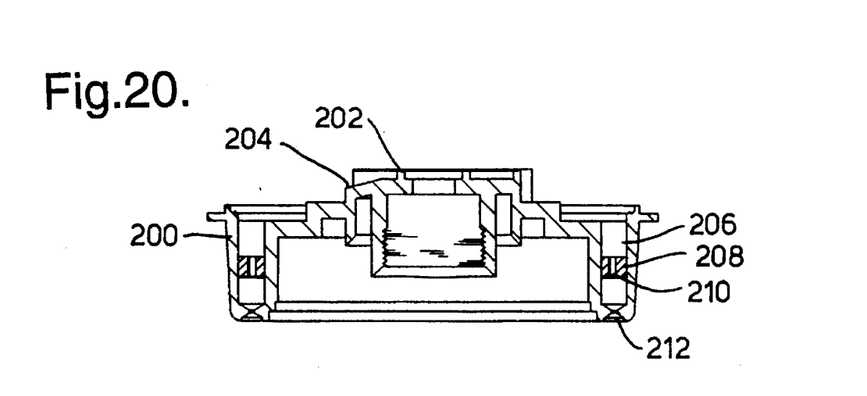
FIG. 20 shows a view along XX—XX in FIG. 19.
Figure 21:
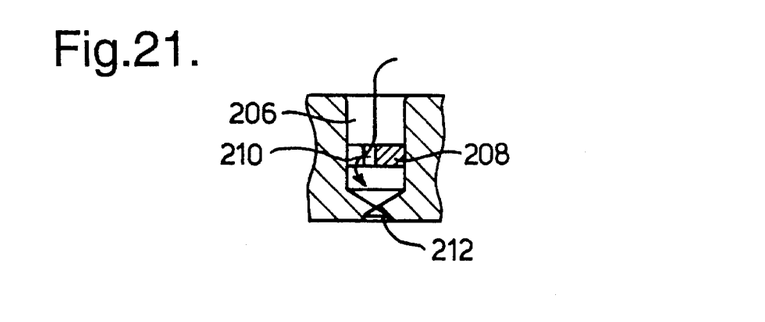
FIG. 21 shows an enlarged view of the water path through the mist channel, along XXI—XXI in FIG. 19.

FIGS. 19 to 21 illustrate a second specific embodiment for creating a mist spray. The diverter 200 has a moulding 202 on its upper surface 204. As, with the first embodiment described above, the moulding has a series of channels which connect the apertures in the divider with the spray apertures. Each mist channel 206 contains a mist-pin 208. Each mist pin 208 has a water channel 210 which passes through it. The water channel 210 is not straight but is offset and so provides a twisted water path. The restriction on the water flow together with the twist in the water channel 210 causes water flowing through the mist channel 206 to spin. Water then emerges through the mist apertures 212 as a mist or fine spray. The line z'—z' illustrates the water path through the mist pin 208.

In a further embodiment (not illustrated), spiralling grooves are moulded into part of the walls of each mist channel, about two-thirds of the way down each channel. A stopper, such as a small rubber plug, is inserted into each mist channel and positioned adjacent the spiralling grooves so that water running through the mist channels is restricted to the grooves and so spins before reaching the mist apertures.

I claim:

1. A shower head having more than one spray mode including a mist spray mode, the shower head comprising:

an inlet portion including a water inlet;

means moveable relative to the inlet portion to bring selectively into register with the inlet portion a plurality of spray faces each capable of providing a different spray mode, and one of which is a spray face producing the mist spray mode; and a locking device operable to preclude movement of the mist-producing spray face relative to the inlet portion when the mist spray mode has been selected by a user, said locking device being moveable from an unlocked position to a locked position and including gasket means for automatically placing the locking device in said locked position after selection whereby, when in the locked position, the user cannot bring any other spray face into register with the inlet portion.

2. A shower head according to claim 1 wherein the locking device is moveable into a locking position to prevent such movement by means of pressure of water within the shower head.

3. A shower head according to claim 2 wherein the locking device is releasable to allow the said movement when the pressure of water within the shower head is below a threshold value.

4. A shower head having more than one spray mode including a mist spray mode, the shower head comprising:

an inlet portion including a water inlet;

means moveable relative to the inlet portion to bring selectively into register with the inlet portion a plurality of spray faces each capable of providing a different spray mode, and one of which is a spray face producing the mist spray mode; and a locking device only operable when the mist spray mode has been selected by a user to preclude movement of the mist-producing spray face relative to the inlet portion, said locking device including gasket means for locking the mist spray mode after selection, and said locking device being movable from an unlocked position to a locked position, whereby when in said locked position, the user cannot bring any other spray face into register with the inlet portion.

5. A shower head according to claim 4 wherein the locking device comprises a locking pin moveable between an open position in which the locking pin allows the movement of the mist-producing spray face and a locking position in which the locking pin prevents the movement of the mist-producing spray face.

6. A shower head according to claim 5 wherein the locking pin is biassed towards the open position.

7. A shower head according to claim 6 wherein the locking pin is located within the inlet portion and the means moveable relative to the inlet portion includes a restraint with which the locking pin is engageable in the mist spray mode to prevent such movement.

8. A shower head according to claim 1 wherein the means moveable relative to the inlet portion includes:

mist channels leading to mist apertures in the mist-producing spray face; and a spiralling water path formed in each mist channel whereby water will emerge from the mist apertures as a fine spray or mist.

9. A shower head according to claim 8 wherein each mist channel contains a mist pin which at least partly provides the spiralling water path.

10. A shower head according to claim 9 wherein the water path is provided by spiralling grooves in the surface of each mist pin.

11. A shower head according to claim 9 wherein the water path is provided by a twisted water channel through each mist pin.

12. A shower head according to claim 9 wherein the water path is provided between spiralling grooves in the walls of each mist channel and the mist pin is in the form of a stopper located in each mist channel adjacent the grooves.

* * * * *